United States Patent [19]

Scaramozzino

[11] Patent Number: 5,755,635
[45] Date of Patent: May 26, 1998

[54] CRANK DEVICE FOR THE TRANSMISSION OF ENERGY WITH ELIMINATION OF DEAD CENTERS, PARTICULARLY SUITED FOR BICYCLES AND THE LIKE

[75] Inventor: Domenico Scaramozzino, Savona, Italy

[73] Assignee: Draco Limited, Douglas, United Kingdom

[21] Appl. No.: 554,428

[22] Filed: Nov. 6, 1995

[51] Int. Cl.⁶ ............................................. G05G 1/12
[52] U.S. Cl. ........................ 474/150; 474/903; 74/594.2
[58] Field of Search ............................ 474/150, 152, 474/153, 155, 903; 74/594.2

[56] References Cited

U.S. PATENT DOCUMENTS

| 599,970 | 3/1898 | Menk ............................ 474/153 X |
| 4,768,998 | 9/1988 | Hirose et al. ...................... 474/152 |
| 4,816,009 | 3/1989 | Philipp ........................... 474/152 X |
| 5,067,370 | 11/1991 | Lemmens ........................ 474/152 X |

FOREIGN PATENT DOCUMENTS

| 0 630 804 | 6/1994 | European Pat. Off. . |
| A-763303 | 11/1933 | France . |
| A-1296591 | 3/1961 | France . |
| A-815772 | 1/1958 | United Kingdom . |

*Primary Examiner*—Roger Schoeppel
*Attorney, Agent, or Firm*—Lowe, Price, LeBlanc & Becker

[57] ABSTRACT

The pedal cranks (32, 34) on the propulsion group of a bicycle or similar rotate independently with respect to one another around axis (a), which is parallel and spaced at a distance (d) from axis (b) of a chain drive sprocket wheel (28). Each pedal crank is constrained to rotate together with the sprocket wheel but is free to travel over the same. An adjustment for the position of the sprocket wheel, around the axis of the pedal cranks, is provided for.

8 Claims, 3 Drawing Sheets

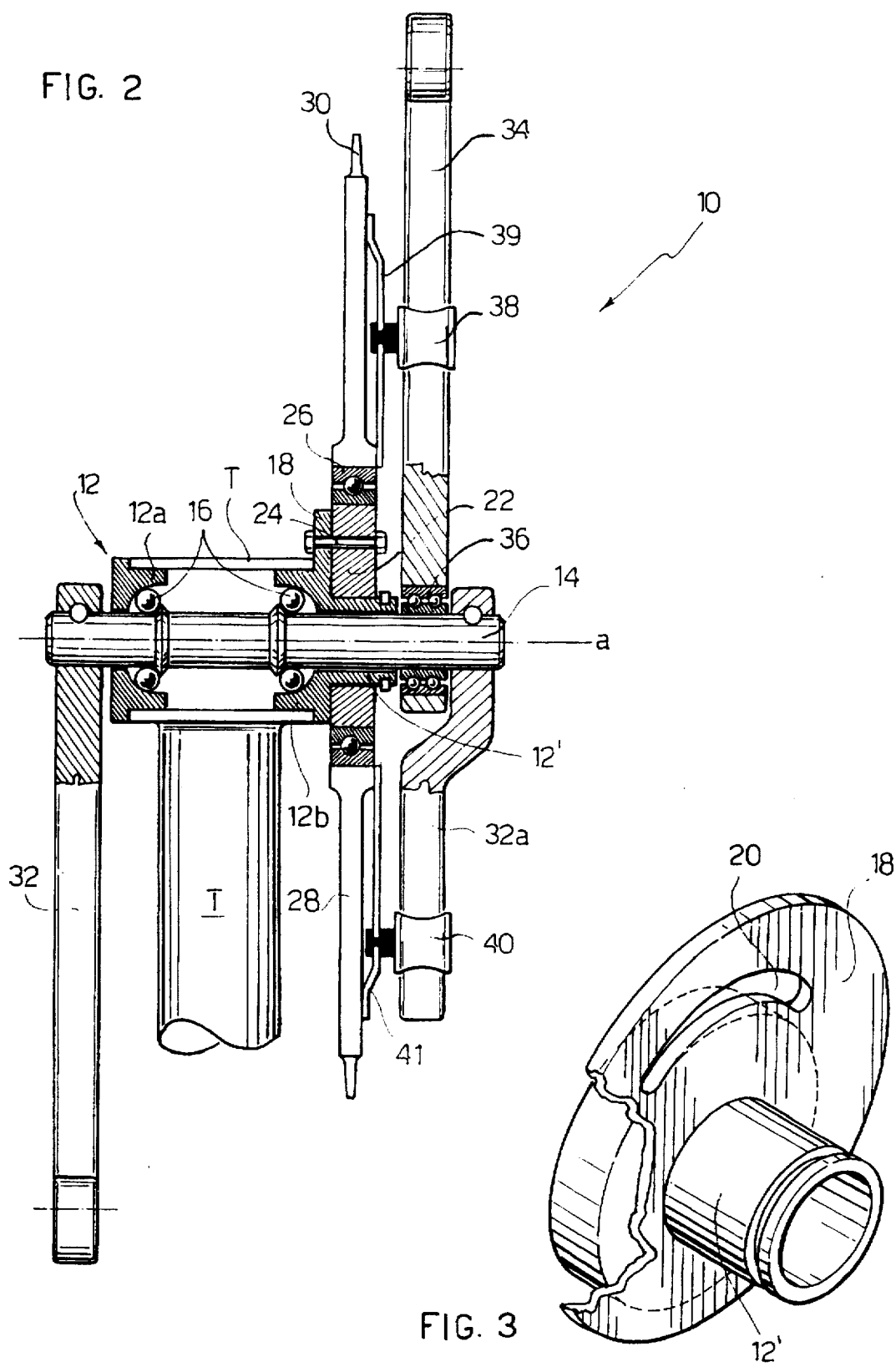

CRANK DEVICE FOR THE TRANSMISSION OF ENERGY WITH ELIMINATION OF DEAD CENTERS, PARTICULARLY SUITED FOR BICYCLES AND THE LIKE

BACKGROUND OF THE RELATED ART

Field of the Invention

This invention relates to apparatus for eliminating dead centers in a crank mechanism. More particularly, it relates to such a device readily mountable to existing pedalled vehicles and the like.

In the field of energy transmission between components having a reciprocating motion and components having a rotating motion, continuous technical research has aimed at improving the efficiency of such transmissions.

In the bicycle sector, in particular, there has been a continuous effort to take greater advantage of the energy imparted to the pedals by the rider through the use of multipliers, gear ratios, gear selectors, etc.

The invention is intended to further improve the transmission performance between the energy imparted by the person or other means acting upon the pedal cranks or pedals, and the energy that can actually be used for the propulsion of, for example, bicycles and similar.

It was observed that, in prior art bicycles whose pedal cranks are connected together and rotatable around an axis coinciding with the axis of the chain drive sprocket wheel, the energy transmitted by the rider is variable according to the position of the pedals as they travel in a circular path around the axis of rotation; see FIG. 4. In fact, such energy is decidedly lower in the part where a traction force is exerted on the pedal (upward pedal travel) and significantly greater in the part where pressure is exerted on the pedal (downward pedal travel) and having two areas with no efficiency in the transmission of movement (dead centers), i.e., where the pedal cranks are both in a direction that substantially coincides with the directions of the forces acting upon the pedal cranks.

To explain in greater detail, during a single 360° clockwise rotation of pedals A–B, the pedal cranks consecutively assume the positions illustrated in steps 4a, 4b, 4c, 4d. The positions in which the pedal cranks are vertical (4a, 4c) or close to a vertical position (for simplicity's sake, only vertical positions will be mentioned hereafter), are virtually or completely inefficient for transmitting energy from the rider to the bicycle; from an inclined position at angle α, clockwise with respect to a vertical position, and for the entire arc of 180°-2α as indicated in FIG. 4a, the rider exerts a very effective pressure on the pedal travelling over said arc (pedal B in FIG. 4b, pedal A in FIG. 4d); and, if a suitable pedal is used, the rider can simultaneously exert a less effective traction force on the other pedal, A or B.

SUMMARY OF THE DISCLOSURE

A principal object of this invention is to take advantage of the so-called positive areas of transmission and to reduce those areas considered to be of little or no transmission; in other words, the objective is to eliminate the "dead center" positions in which the positions of the two pedal cranks are aligned with the relative forces acting upon the pedal cranks.

This objective has been achieved with a device as said in claim 1. Additional characteristics are mentioned in the dependent claims.

The new device includes two cranks or pedal cranks that are free to turn with respect to one another around the same axis of rotation which is parallel and spaced with respect to the axis of rotation of a chain drive sprocket wheel or similar component. The pedal cranks are also constrained to rotate together with the sprocket wheel but are free to travel over the wheel so that they can align with each other in at least one position where the plane of their axes includes the axis of the wheel.

The invention allows each pedal to travel through an arc of inefficient or little efficient positions more quickly with respect to an arc of efficient positions. The invention also allows always one pedal to be in the arc of the efficient positions; particularly, when one pedal is located with its crank in a vertical position with respect to the ground, the other pedal crank will be at an inclined position and ready for receiving a thrust.

The invention allows the pedalling force to be varied in a constant and continuous manner, concentrating this force in that pedalling range where power transmission efficiency is highest, and dispersing it in the areas where power transmission efficiency is lowest. The device allows the rider to choose the area, duration and intensity of force transmission within the range of a 360° pedal stroke. Furthermore, it also eliminates the dead centers since, at the moment when one pedal has finished its active pedalling stroke and is in a practically vertical position with respect to the ground, the other pedal will have passed the vertical position and will thus be ready to receive energy.

BRIEF DESCRIPTION OF THE DRAWING

The invention will now be described in greater detail with reference to the enclosed drawings wherein an exemplary unrestrictive embodiment of the invention is shown. In the enclosed drawings:

FIG. 2 is a cross-section along plane 2—2 in FIG. 1; an aligned position of the pedals has been drawn in said plane;

FIG. 3 is a perspective view of an element of the device;

DETAILED DESCRIPTION OF THE PREFERRED EMBODIMENTS

Figure 1:
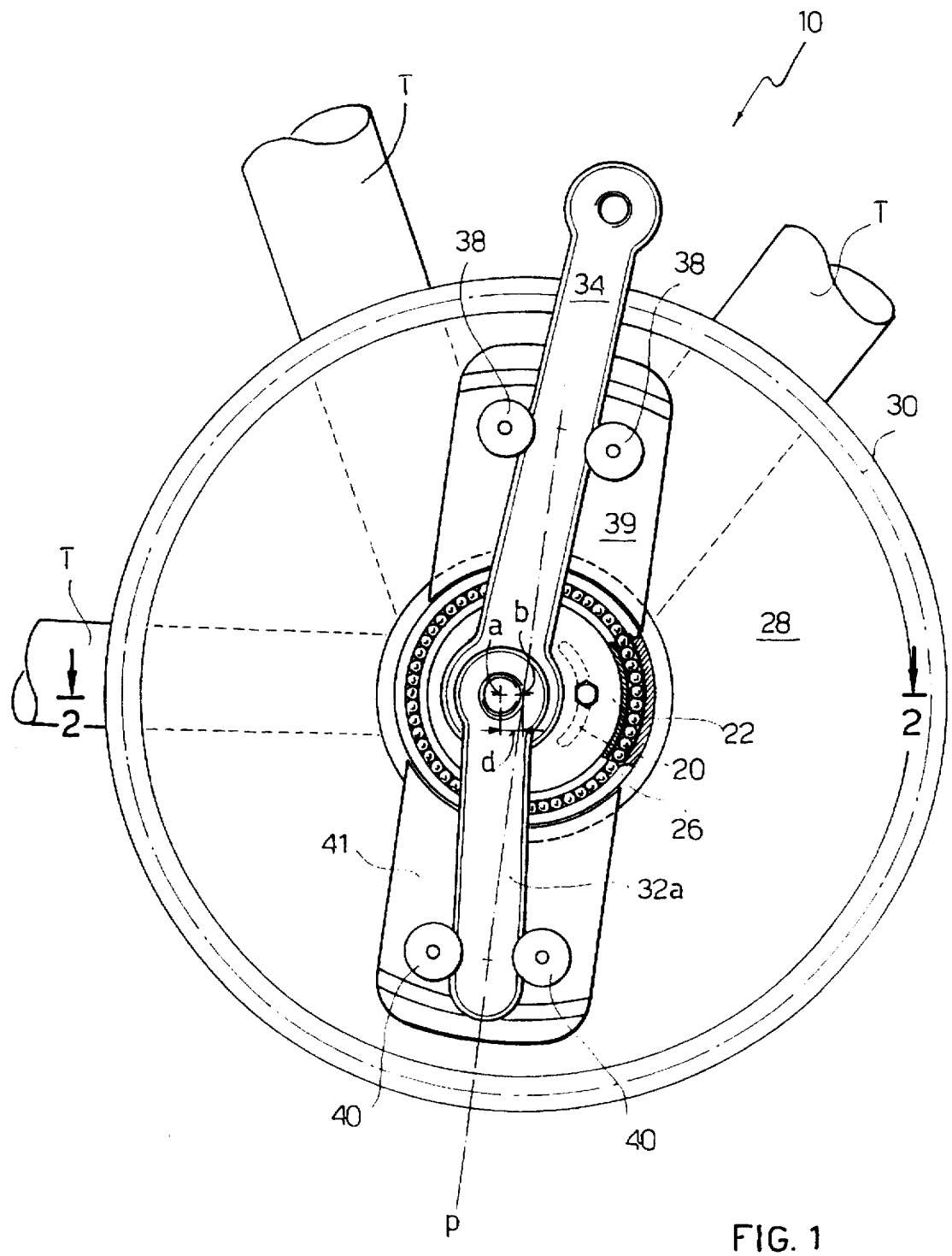
FIG. 1 is a side view of a chain drive sprocket wheel of a bicycle of the invention.

The device as a whole, is indicated in the figures with reference 10. In the figures a per se known bicycle frame is partially shown and referenced T; this frame, which is composed of metal tubes, will not be described in detail since it is known. The frame has a support 12 made up of two parts: 12a and 12b. The support has a through seating for housing a shaft or hub 14. This shaft or hub is freely rotatable around a first axis a, and is mounted in the support by means of ball bearings 16.

Half-support 12b is equipped with a flange 18 having a slotted hole 20 extending in an arc around axis a, and tubular extension 12'.

A disc 22 is mounted in a fixed eccentric manner on tubular extension 12'. The disc defines its own axis b (FIG. 1), spaced from a at distance d and parallel to a.

Disc 22 is attached to support 12 by any means; for example, by screws, such as 24 in FIG. 2, which engage a hole in disc 22 and slotted hole 20.

The periphery of disc 22 is equipped with ball bearing 26 on whose external ring is mounted a sprocket wheel 28 whose teeth 30 can engage the transmission or drive chain of the bicycle.

Shaft 14 mounts pedal crank 32 on the side of semi-support 12a, and auxiliary semi-pedal crank 32a on the other side, of semi-support 12b. Shaft 14 mounts the second pedal crank 34 which is free to rotate around the shaft by means of bearing 36. Each pedal crank can be constrained by any suitable system to rotate together with the sprocket wheel; on the figures, such system comprises a pair of idle rollers 38 integral with the sprocket wheel (through metal plate 39), for pedal crank 34, and a pair of idle rollers 40 integral with the sprocket wheel (through metal plate 41) for auxiliary pedal half-crank 32a. The position of the idle rollers on the wheel is such that a central plane between rollers 38 (line p in FIG. 1) coincides with a central plane between rollers 40 and also contains axis b. The rollers engage each pedal crank on either of its sides in such a way as to allow the pedal crank to slide freely along the rollers while at the same time constraining the pedal crank to rotate together with the sprocket wheel.

The constraint between the pedal cranks and the sprocket wheel can be created by mechanical systems other than rollers, e.g., by means of levers, tension rods or similar components.

It should be noted that screw 24 can attach wheel 28 to flange 18 in any of a number of angularly adjusted positions around axis a; in other words, the plane containing a and b may be inclined with respect to the horizontal, instead of being horizontal as shown in FIG. 1.

Figure 4A:
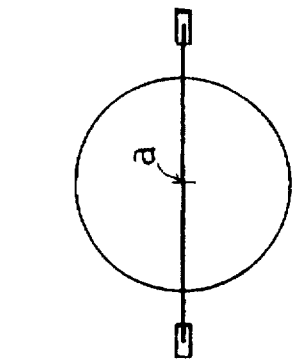
FIG. 4 schematically shows four positions of a prior art mechanism, which are respectively indicated by 4a, 4b, 4c, 4d.
Figure 4B:
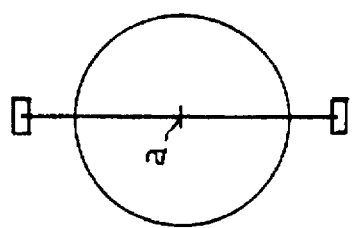
Figure 4D:
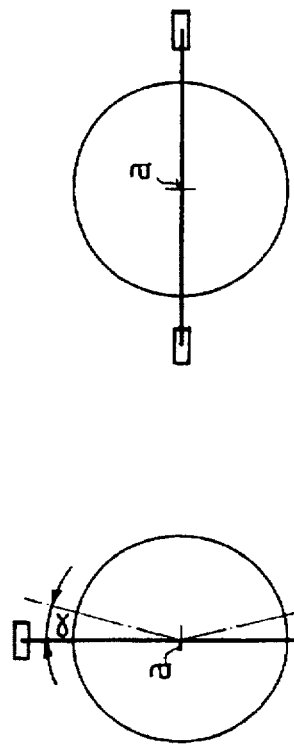

The operation of the device will now be described with reference to FIG. 5, and will simultaneously be compared to the operation of a prior art mechanism as depicted in FIG. 4.

Figure 5A:
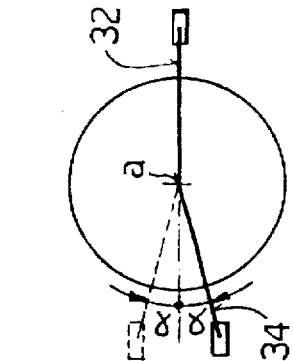
FIG. 5 shows four positions of the device of the invention, which are respectively indicated by 5a, 5b, 5c, 5d and correspond to the positions given in FIG. 4.
Figure 5B:
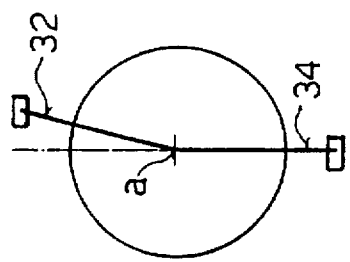
Figure 5D:
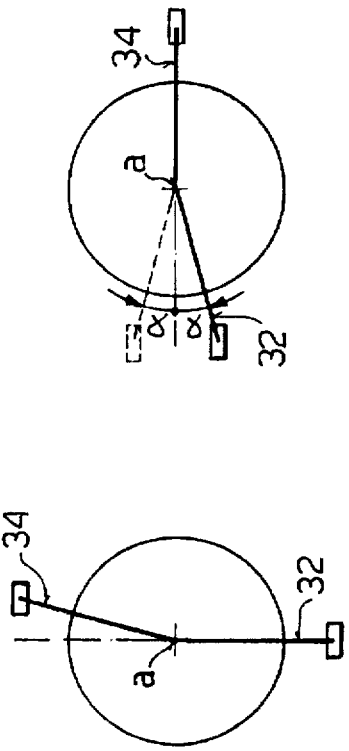

As can be seen in step 5a in FIG. 5, when a pedal and its crank (i.e.: 32, 32a) on the new device is in the lower vertical position, the other pedal crank 34 has already passed the vertical position and is inclined by α, so that it is at the beginning of the active area of the pedalling arc and will allow for a more efficient pedalling stroke. When pedal crank 34 is about to reach a horizontal position, as illustrated in step 5b, pedal crank 32 travels quickly through arc 2α, as indicated in FIG. 5b, passing from a position that is inclined downwards by −α, with respect to the horizontal plane, then through a horizontal position and on to a position inclined by α, beyond the horizontal plane, so that a following rotation by 90°, as shown in FIG. 5c, takes pedal crank 34 to the lower vertical position; this corresponds to a position of pedal crank 32 inclined by α with respect to the vertical plane and to the beginning of the active area of the pedalling arc; thus, when an efficient pedalling thrust cannot be applied to pedal crank 34, it will be possible to apply an efficient thrust to pedal crank 32. Analogously, when pedal crank 32 moves to the horizontal position (step 5d), pedal crank 34 quickly travels over an arc extending from −α to +α, so that during the next 90° rotation, when pedal crank 32 moves to the lower vertical position, pedal crank 34 will move to angle α beyond the upper vertical position (step 5a) at which the pedal crank is ready for useful or active stroke.

Although the present invention has been described and illustrated in detail, it should be clearly understood that the same is by way of illustration and example only and is not to be taken by way of limitation, the spirit and scope of the present invention being limited only by the terms of the appended claims.

I claim:

1. A crank device for transmission of energy, including:

a drive wheel rotatable around a wheel axis;

a pair of cranks rotatable around a crank axis which is not coincident with the wheel axis;

a support containing said crank axis, each of said cranks being free to rotate with respect to the other around said crank axis, one of said cranks being integral with an auxiliary crank extending on the same side as the other crank, said auxiliary crank and said other crank being slidable over said wheel;

means for engaging said drive wheel and said cranks to rotate said drive wheel around said wheel axis when said cranks are rotated around the crank axis; and a disc member defining said wheel axis, said drive wheel being rotatable on said disc member, said disc member being mounted on said support.

2. The device according to claim 1, wherein:

said cranks are aligned with each other along a plane that contains the wheel axis, in a position in the rotation of said cranks.

3. The device according to claim 1, wherein:

said means for engaging said wheel and said cranks comprises two pairs of idle rollers on the wheel.

4. The device according to claim 1, for a manually powered vehicle, wherein:

said cranks are pedal cranks, said crank axis is defined in a frame housing of the vehicle, and said drive wheel comprises a sprocket wheel.

5. The device according to claim 4, wherein:

said support is received in said frame and comprises a first semisupport on the side of a first crank and a second semisupport on the side of the second crank and half-crank, wherein said second semisupport has a hub and said disc is mounted on said hub.

6. The device according to claim 5, wherein:

said disc is mounted on the hub in an angularly adjustable way around the crank axis of the hub so that the disc can be mounted thereto in various angular positions.

7. The device according to claim 1, wherein:

said means for engaging said wheel and said cranks comprises one of a lever or a tension rod.

8. The device according to claim 1, adapted to be mountable on a known cycle.

* * * * *